United States Patent
Jacobs et al.

(10) Patent No.: US 9,487,424 B2
(45) Date of Patent: Nov. 8, 2016

(54) TREATMENT OF RAW BRINES FROM DESALINATION PLANTS

(75) Inventors: Oliver Jacobs, Osnabrück (DE); Ruslan Khazhsetovich Khamizov, Moscow (RU)

(73) Assignee: I-E-S e.K., Inhaber Dr. Oliver Jacobs, Osnabrück (DE)

( * ) Notice: Subject to any disclaimer, the term of this patent is extended or adjusted under 35 U.S.C. 154(b) by 433 days.

(21) Appl. No.: 14/002,728

(22) PCT Filed: Feb. 21, 2012

(86) PCT No.: PCT/EP2012/000747
§ 371 (c)(1),
(2), (4) Date: Oct. 30, 2013

(87) PCT Pub. No.: WO2012/116788
PCT Pub. Date: Sep. 7, 2012

(65) Prior Publication Data
US 2014/0048485 A1      Feb. 20, 2014

(30) Foreign Application Priority Data

Mar. 2, 2011   (DE) .................. 10 2011 012 805

(51) Int. Cl.

| | |
|---|---|
| C02F 1/28 | (2006.01) |
| C02F 9/00 | (2006.01) |
| B01D 39/00 | (2006.01) |
| C02F 103/08 | (2006.01) |
| C02F 1/44 | (2006.01) |
| C02F 1/52 | (2006.01) |

(Continued)

(52) U.S. Cl.
CPC ............ *C02F 9/00* (2013.01); *C02F 1/281* (2013.01); *C02F 1/04* (2013.01); *C02F 1/44* (2013.01); *C02F 1/447* (2013.01); *C02F 2001/425* (2013.01); *C02F 2001/5218* (2013.01); *C02F 2103/08* (2013.01); *C02F 2209/02* (2013.01); *C02F 2209/05* (2013.01)

(58) Field of Classification Search
None
See application file for complete search history.

(56) References Cited

U.S. PATENT DOCUMENTS

| | | | | |
|---|---|---|---|---|
| 3,322,690 A | * | 5/1967 | Bilisoly | .................. B01J 29/06 208/111.15 |
| 3,369,865 A | * | 2/1968 | Mattox | .................. B01J 20/186 502/64 |

(Continued)

FOREIGN PATENT DOCUMENTS

| | | |
|---|---|---|
| DE | 44 11 049 | 10/1995 |
| DE | 10 2008 059 064 | 5/2010 |

(Continued)

OTHER PUBLICATIONS

Shang Y. et al.: Study on adsorption of N2 and O2 by magnesium (II)-exchanged zeolite A; Journal of Alloys and Compounds; 476 (2009) L5-L7.

*Primary Examiner* — Allison Fitzsimmons
(74) *Attorney, Agent, or Firm* — Gudrun E. Huckett

(57) ABSTRACT

A method for treatment of raw brines from desalination plants (6) having a total salt content greater than 60 g/l, wherein, inter alia, a magnesium ion-containing solution having a magnesium ion content greater than 1 g/l at a temperature between 75° C. and 100° C. is passed through a first vertical column (42) containing a bed packing of zeolite A (84) with a flow direction from top to bottom and the raw brine that is to be treated is passed at a temperature of 30° C. to 45° C. through this packed first column (42) in the direction of flow from top to bottom until the calcium ion concentration of the eluate leaving the first column (42) indicates a breakthrough of calcium ions through the bed of zeolite A (44).

14 Claims, 3 Drawing Sheets

(51) Int. Cl.
*C02F 1/04* (2006.01)
*C02F 1/42* (2006.01)

(56) References Cited

U.S. PATENT DOCUMENTS 4,461,631 A * 7/1984 Itabashi .................. B01J 20/18
  252/184
4,874,729 A * 10/1989 Klazinga ................ C10G 47/16
  502/61
5,681,477 A * 10/1997 Leavitt .................... B01J 39/14
  210/672
5,814,224 A * 9/1998 Khamizov ............... B01J 39/02
  210/638
6,508,936 B1 1/2003 Hassan

FOREIGN PATENT DOCUMENTS

WO 2007/132477 A1 11/2007
WO 2010/123926 A2 10/2010

* cited by examiner

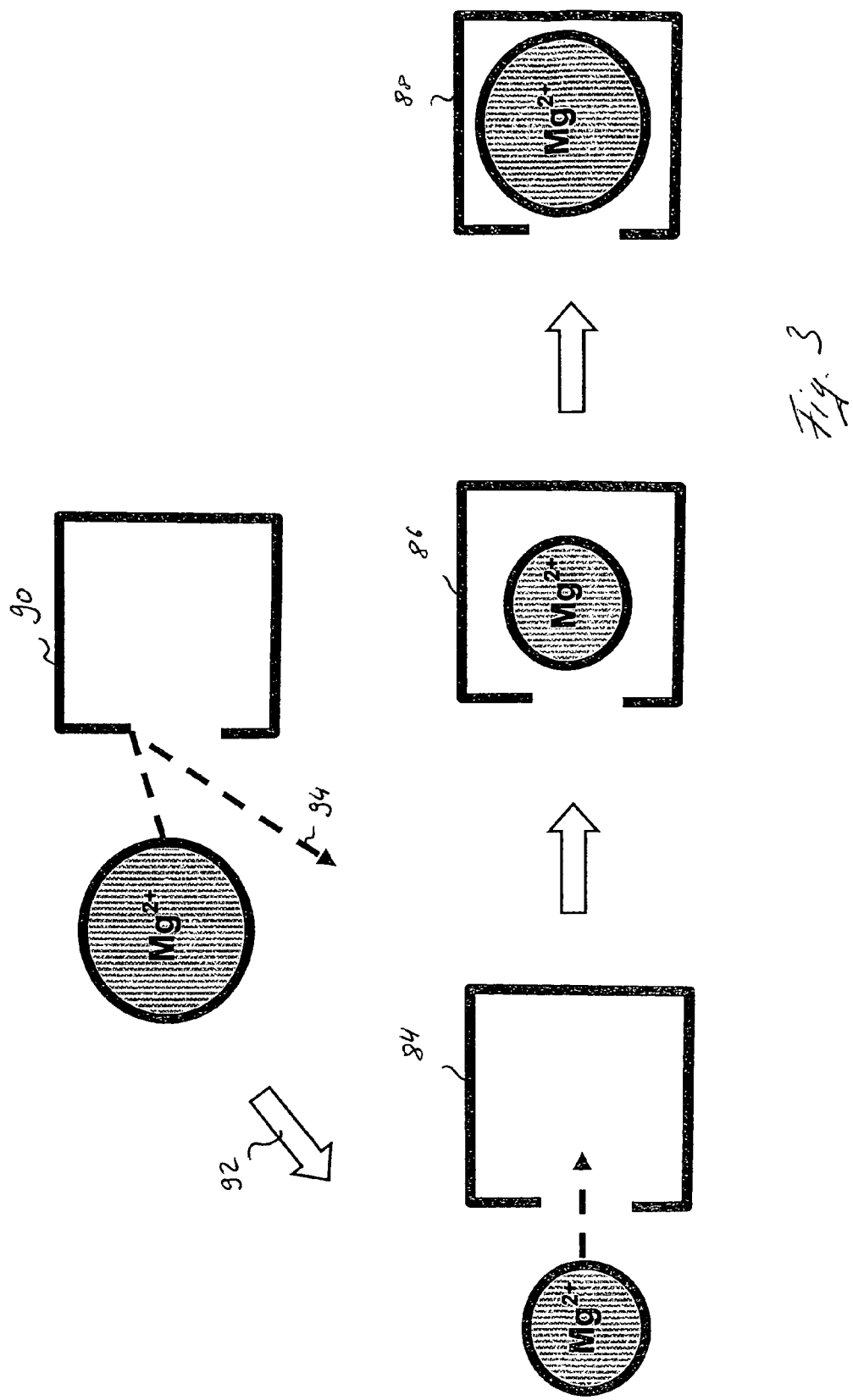

TREATMENT OF RAW BRINES FROM DESALINATION PLANTS

BACKGROUND OF THE INVENTION

The invention concerns a method for treatment of raw brines from desalination plants with a total salt content of greater than 60 g/l as well as a device for performing such a method.

It is known to employ seawater for producing drinking water. For this purpose, the seawater is separated in a seawater desalination plant into freshwater and into raw brine. A known method for desalinating seawater is for example reverse osmosis (RO). The salt content of seawater is lowered with such a method from approximately 35,000 ppm to a total salt content of less than 500 ppm. The reverse osmosis (RO) is a membrane method that operates with pressure. The osmotic pressure of seawater is approximately 25 kg/cm$^2$. When seawater is pressed in a reverse osmosis system at a pressure higher than its osmotic pressure through the membrane, the seawater is separated into freshwater (permeate) and saltwater (concentrate). The higher the total salt content, the higher the osmotic pressure. High pressure pumps consume a lot of energy and represent a significant cost factor in producing freshwater. In conventional seawater reverse osmosis methods (SWRO), from the supplied water approximately 42% freshwater are obtained while 58% concentrate remains. The concentrate (raw brine) has a total salt content of approximately 60,000 ppm (almost 1.7 times the salt content of seawater). A more effective desalination is difficult to achieve not only due to pressure problems but also because of the problems of clogging of the membrane with gypsum and other hardness components of the seawater. These limitations cannot be prevented even with an acid pretreatment of untreated seawater and addition of chemicals for prevention of deposits.

A further method for producing drinking water from seawater is thermal distillation. The most common distillation methods include the multi-stage flash evaporation (MSF), the multi-effect distillation (MED), and vapor compression (VC). In MSF, the supplied water is heated and pressure is reduced so that the water turns to vapor in a flash. This process represents one stage of several serially connected stages of which each is at a lower pressure. In MED, the supplied water is passed through several evaporators that are connected in series. The vapor of one row is subsequently used in order to evaporate the water in the next row. The VC method comprises evaporation of the supplied water, compression of the vapor, the subsequent use of the heated compressed vapor as a heat source for evaporation of further supplied water. Some distillation plants are a mix of more than one desalination technology. The waste product of these processes is a solution with a high salt concentration (raw brine). In conventional thermal distillation processes from the supplied water less than 47% of freshwater are obtained while more than 53% of concentrate remains. The concentrate has a total salt content of approximately 65,000 ppm (almost 1.8 times the salt content of seawater). These limitations are caused by the generation of deposits on heating surfaces of evaporators from hardness components of the seawater, in particular gypsum. Because of the anomalous effect of the reduction of the gypsum solubility in hot solutions, this limitation is often referred to as the "gypsum barrier".

None of the aforementioned industrial desalination methods is an environmentally friendly technology and they cause enormous contaminations in the marine animal and plant world. All desalination facilities in the world together introduce annually approximately 9 cubic kilometers (9,000,000,000 m$^3$/y) of concentrates without treatment directly into the coastal areas of the oceans which leads to an ecological imbalance. Moreover, there are economic disadvantages. For example, the raw brine that is discharged into the ocean contains large quantities of valuable components such as magnesium, sodium, potassium, and rare metals that are not utilized.

In order to reduce these problems, several methods have been developed which limit the proportion of the produced raw brine. U.S. Pat. No. 6,508,936 discloses a combined method for seawater desalination in order to obtain a very high yield of freshwater. In the method, nanofiltration as a first desalination step is used in combination with thermal distillation, such as the multi-stage flash evaporation (MSF) or the multi-effect distillation (MED). A disadvantage of this method is however that the nanofiltration step is relatively expensive for the purpose of lowering the seawater hardness so that in the step of thermal distillation subsequently more freshwater can be obtained. Moreover, with this method raw brine is also generated.

A method for seawater desalination without producing a raw brine that cannot be processed further is disclosed in WO 2007/132477. In this method, the seawater is first subjected in a pretreatment step to nanofiltration wherein preferably bivalent ions are removed. The removal is approximately 85% per passage and, moreover, not more than 30% of the monovalent ions reach the retentate. This retentate with a high proportion of bivalent ions is utilized for obtaining magnesium and other bivalent ions. The permeate that is containing substantially no bivalent ions can be subjected to a three-stage high-pressure desalination with reverse osmosis (HPSWRO) for producing freshwater. The high-purity brine (HPSWRO concentrate flow with a total salt content of more than 85,000 ppm) can be used by means of electrolysis for obtaining sodium hydroxide, chlorine, and hydrogen. This method has however a few disadvantages. The nanofiltration and the multi-stage HPSWRO require an additional energy expenditure and are also cost-intensive. Moreover, in practice there are significant difficulties with a thorough and separate removal of magnesium and calcium from the nanofiltration concentrate.

In view of the afore described prior art, the invention has the object to provide a method with which raw brine from desalination plants with a total salt content of greater than 60 g/l can be operated with little energy input and cost-efficiently.

SUMMARY OF THE INVENTION

This object is solved by the device according to the invention, the device comprising a seawater desalination plant for separating seawater into drinking water with a total ion content below 3 g/l and into a raw brine with a total salt content of more than 60 g/l, and comprising a raw brine processing plant downstream of the seawater desalination plant wherein the raw brine processing plant comprises:

i) a sorption unit for partial removal of calcium ions from the raw brine according to step d) of the method according to the invention, comprising at least a first and an additional vertically arranged columns packed with thermally modified zeolite (TMZ), wherein the TMZ is producible in that the solution with a magnesium ion content greater than 1 g/l at a temperature between 75° C. and 100° C. is passed through the vertical columns containing a packing of zeolite A, ii) a desalination unit for separating the partially decalcified brine from the sorption unit into water with a total ion content smaller than 500 mg/l and into a concentrated brine according to step e) of the method according to the invention, iii) a solids unit for separating the high-concentrated calcium ion-rich brine into solids and into water with a total ion content smaller than 500 mg/l according to step g) of the method according to the invention, and iv) at least three heat exchangers wherein a first and a second heat exchanger are connected behind each other and upstream of the inlet into the sorption unit alternatively from above to the first or from above to the additional column for optional heating of the raw brine, wherein the first heat exchanger is a recuperator that can be heated with the partially decalcified concentrated brine from the desalination unit, and wherein the second heat exchanger can be heated or cooled with heated or cold water, and wherein the third heat exchanger downstream of the recuperator and upstream of the inlet into the sorption unit is alternatively arranged at the bottom at the first or at the bottom at the additional column and is embodied for cooling the still warm, partially decalcified concentrated brine from the desalination unit that is exiting from the recuperator before it enters the sorption unit.

The object is solved further by the method according to the invention for treating raw brines from desalination plants with a total salt content greater than 60 g/l, the method comprising the following steps in this sequence:

a) a magnesium ion-containing solution with a magnesium ion content greater than 1 g/l, in particular raw brine from the seawater desalination plants with a total salt content greater than 60 g/l, is passed at a temperature between 75° C. and 100° C. through a first vertical column containing a bed packing of zeolite A with a flow direction from top to bottom, wherein the zeolite A is converted thereby to thermally modified zeolite (TMZ);

b) the interior of the column packed with the bed of TMZ is cooled to a temperature of below 45° C.;

c) a sodium ion-containing solution with a sodium ion concentration of more than 50 g/l and with a temperature of below 45° is passed in a flow direction from bottom to top through the bed of TMZ in the first column;

d) the raw brine to be treated is passed at a temperature of 30° C. to 45° C. in flow direction from top to bottom through the first column packed with a bed of TMZ until the calcium ion concentration of the eluate that is exiting from the first column surpasses a value of 1,000/n mg/l and thus indicates a break-through of calcium ions through the bed of TMZ, wherein n is the factor of concentration increase of the eluate in the next step e);

e) the eluate of step c) is separated in a desalination device into water with a total salt content of less than 500 mg/l and into a higher concentrated brine with a calcium ion concentration of less than 1,000 mg/l, wherein a concentration increase of the higher concentrated brine relative to the eluate by the factor n is realized;

f) the concentrated brine of step e) is passed at a temperature of below 45° C. in a flow direction from bottom to top through the bed of TMZ in the first column;

g) the concentrated eluate of the method step f) is separated in a solids unit into solids and water;

h) the method steps d) through g) are repeated until the capacity of the TMZ is exhausted, which is expressed in that the eluate in step d) immediately after conversion of the TMZ into the sodium form by the step f) already in the first bed volume that has passed through has a calcium ion concentration that, with otherwise identical conditions, is 20% higher than the calcium ion concentration in the first bed volume that has passed through in the step d) immediately after performing the steps a) to c).

Raw brine from seawater desalination plants, just like seawater itself, contains significantly more magnesium ions than calcium ions. The zeolite A which is utilized in method step 1a) can absorb magnesium as well as calcium and releases the ions again in case of a significant excess of sodium. The concentration of sodium ions of the concentrated brine of step e) that is used in step f) is however not sufficient to desorb the magnesium ions which are loosely absorbed in the zeolite A as well as the loosely absorbed calcium ions. In method step 1a), the zeolite A is therefore converted into a thermally modified zeolite (TMZ) in which all functional areas of the zeolite structure that can absorb magnesium ions are blocked by incorporating magnesium ions with a large hydrate envelope. Decisive for the blockage in this context is that the temperature of the magnesium ion-containing solution is between 75° C. and 100° C. and that the column interior subsequently is cooled in step b) to a value of below 45° C.

In step c), the calcium form of the TMZ present after the steps a) and b) is converted to the sodium form of TMZ. Subsequently, in step d) calcium is separated from the raw brine to be processed in the column and, in return, sodium ions are released into the eluate. The eluate is subsequently separated into a higher concentrated brine but with a calcium ion concentration of less than 1,000 mg/l and into water. In doing so, a concentration increase by the factor n of the higher concentrated brine relative to the original eluate obtained in step d) takes place. The total ion concentration of the eluate is in this context preferably 130 g/l to 300 g/l.

After completion of step d) of the method according to the invention, the TMZ is mostly existing in the calcium form, i.e., the TMZ is hardly loaded with sodium ions and instead is in particular loaded with calcium ions. In step f), the TMZ is then converted into the sodium form. In respect to the TMZ packing of the column, the step d) can be subsequently performed again. The concentrated eluate which is leaving the column in method step f) is subsequently separated into solids and into water.

According to method step h), the method steps d) to g) are repeated until the capacity of the TMZ is exhausted. This can be recognized in that the eluate in step d) immediately after conversion of the TMZ into the sodium form by the step f) already the first bed volume that has passed through, i.e., the volume that is occupied by the packing of TMZ in the column, has a calcium ion concentration which, with otherwise same conditions, is higher by 20% than the calcium ion concentration in the bed volume that has passed through in step d) immediately after having performed the steps a) to c). In step d) the sodium form of the TMZ is thus converted into the calcium form and in this process calcium ions are absorbed in the TMZ and sodium irons are released into the eluate. In step f) the calcium form of the TMZ is returned to the sodium form in that sodium ions from the concentrated brine of step e) are absorbed in the TMZ and at the same time calcium ions are released into the eluate. Pursuant to own measurements, this repeating cyclic working process can be repeated approximately 200 times before the capacity of the TMZ is exhausted. With increasing number of aforementioned cyclic working processes the capability of TMZ for calcium absorption in step d) is increasingly reduced. As soon as the calcium ion concentration in the first bed volume that has passed through in step d), i.e., in the eluate obtained in step d) immediately after conversion of the TMZ into the sodium form by the step f), is higher by 20% than the calcium ion concentration in the first bed volume that has passed through in the step d) immediately after performing the steps a) to c), i.e., immediately after a fresh production of the TMZ by method steps a) to c).

In step e) of the method according to the invention, a concentration of the eluate takes place with extraction of freshwater without the calcium ions impairing the concentration by formation of undesirable deposits.

With the method according to the invention, it is possible that the raw brine to be treated is already subjected in method step e) to a significant concentration with recovery of freshwater and that the concentrated eluate produced in the method step f) is already very highly concentrated before it is further processed in the method step g) and is separated into solids as well as water. The treatment of the concentrated eluate in the method step g) is therefore possible in a significantly more cost-effective way and with reduced energy input in comparison to a direct separation of the raw brine into solids and water. The concentrated eluate has in this context preferably a total ion concentration between 130 g/l and 300 g/l.

In step a) and in step d) the flow direction of the raw brine relative to the vertical column is from top to bottom through the bed packing of zeolite A or of TMZ. In step c) as well as in step f), the flow direction, on the other hand, is from bottom to top relative to the vertically oriented column through the bed of TMZ. In this way, an undesirable mixing of calcium-rich and calcium-poor solutions is prevented. In step a) as well as in step d), the boundary between the calcium form of TMZ and the sodium form of TMZ moves from top to bottom while the boundary in the method steps c) and f) moves from bottom to top.

In an especially preferred embodiment of the invention, the exhausted TMZ is reprocessed again by repeating the steps a) to c) according to the invention. Exhaustion of the TMZ is expressed in this context in the already mentioned change of calcium ion concentration of the eluate which is obtained in method step d). Tests have shown that the exhausted TMZ can be regenerated approximately 10 times. Taking into consideration the regeneration of the exhausted TMZ, the method step d) can be repeated with the same absorber packing approximately 2,000 times (200 times up to the exhaustion of TMZ, 10 times regeneration of the exhausted TMZ). The method step d) as well as the method step f) take usually approximately 4 hours. Accordingly, the total utilization duration of a single sorbent packing is approximately two years.

Only when the exhausted TMZ can no longer be regenerated, the sorbent material is exchanged for fresh zeolite A and the method according to the invention is again performed. The TMZ material in the column is considered non-reclaimable and is exchanged when the eluate in step d) immediately after performing the method according to the invention already in the first bed volume that has passed through has a calcium ion concentration which, for otherwise same conditions, is approximately 20% higher than the calcium ion concentration in the first bed volume having passed through in method step d) immediately after first conversion of the zeolite A to TMZ by performing the method steps a) to c). Because of the regeneration of the exhausted TMZ, it is possible to save significant costs for a new packing of the column with zeolite A.

In an especially preferred embodiment of the invention, the method according to the invention is continuously operated by use of an additional column with the same bed packing as in the first column. For this purpose, the method steps a) to h) according to the invention are performed also in connection with the additional column. The steps on the two columns are however temporarily displaced relative to each other such that the steps d) and f) according to the invention are performed always simultaneously and alternatingly on the two columns. For example, for each uneven pass, step f) on the first column and at the same time step d) on the additional column and, for each even pass, step d) on the first column and at the same time step f) on the additional column are performed. In this way, a continuous operation of the method is possible. Due to the continuous operation, idle time periods are reduced and the total quantity of the raw brine that is processed per time unit can be doubled without all components of a device for performing the method according to the invention having to be present twice.

Advantageously, the temperature of the raw brine in the method step d) is always higher than the temperature of the higher concentrated raw brine in the method step f) during flow through the TMZ of the same column. At higher temperatures, the capability of the TMZ for absorbing calcium ions instead of sodium ions is improved. At lower temperatures, on the other hand, the absorbing capacity is changed in favor of the sodium ions. Since in step d) calcium ions are to be absorbed but in step f) sodium ions, with the aforementioned advantageous temperature selection the absorption of calcium in step d) and release of calcium in step f) can be improved.

In a particularly preferred embodiment of the invention, the eluate in step e) is concentrated by factor n and the flow speed in step d) is higher by the factor n than the flow speed in step f). In this way, it is achieved that the method steps d) and f) with consideration of the concentration and the thus resulting volume changes always require the same amount of time. This facilitates a continuous operation of the method. This effect is particularly strong when the method, by use of two columns, is operated continuously, as already described.

The magnesium ion-containing solution in step a) of the method according to the invention is advantageously passed through the bed of zeolite A or through the TMZ with exhausted capacity until the chemical composition of the eluate is identical to the chemical composition of the magnesium ion-containing solution. In this way, it is ensured that all positions of the zeolite A that are receptive for magnesium ions are occupied with magnesium ions and the zeolite A is thus completely converted into TMZ.

In an especially preferred embodiment of the invention, the magnesium ion-containing solution of step a) of raw brine from seawater desalination plants is embodied with a total salt content of greater than 60 g/l. The calcium-poor eluate which is leaving the column in step a) is then subjected for further processing as concentrated partially decalcified brine directly to step e) if the calcium ion concentrate is less than 1,000/n mg/l. In contrast, the subsequently exiting calcium-rich eluate with a calcium ion concentration greater than 1,000/n mg/l is supplied again to the quantity of raw brine from the desalination plant to be processed. As a result, the eluate in step a) is separated into a first portion and a second portion wherein the first portion is already calcium ion-poor and therefore can be further processed while the second portion of the eluate is calcium-rich and must further be processed in analogy to the raw brine. In this way, the already calcium-poor eluate must not unnecessarily be subjected to method step d). Cost and time can be saved in this way.

Advantageously, the sodium-containing solution in step c) is embodied by the partially decalcified and concentrated brine of step e). Accordingly, the production of a separate sodium-containing solution is prevented. The decalcified and concentrated brine of step e) contains a sodium ion concentration of more than 50 g/l. In case of processing of raw brine of seawater desalination plants the decalcified concentrated brine of step e) contains usually approximately 63 g/l sodium ions.

Advantageously, the separation of the eluate in step e) into water and concentrated brine is carried out by means of thermal distillation or membrane distillation wherein the concentration to a total salt content of concentrated brine of 130 g/l to 300 g/l is achieved. Since the eluate of step d) is poor in calcium, the eluate can be significantly concentrated without further concentration being disturbed by generation of gypsum and calcium deposits in the form of the so-called "gypsum barrier".

The object according to the invention is moreover solved by a device for performing the method according to the invention. The device comprises a seawater desalination plant for separating seawater into drinking water with a total ion content below 3 g/l, preferably less than 500 mg/l, and into a raw brine with a total salt concentration of more than 60 g/l. The device comprises moreover a raw brine processing plant which is downstream of the seawater desalination plant. The raw brine treatment plant, in turn, has a sorption unit for partial removal of calcium ions from the raw brine according to step d) that comprises at least a first and an additional vertically arranged column packed with thermally modified zeolite (TMZ). The TMZ can be produced in that a solution of a magnesium ion content greater than 1 g/l can be passed at a temperature between 75° C. and 100° C. through the vertical columns containing a packing of zeolite A. When doing so, the zeolite A is converted to TMZ. For stabilization of the TMZ, the column packing is subsequently cooled advantageously to a temperature of below 45° C. The method step d) can generally be performed also in a sorption unit with only one vertical column. However, then a continuously performed operation is more difficult.

The raw brine processing plant has moreover a desalination unit for separating the partially decalcified brine from the sorption unit into water with a total ion content of less than 500 mg/l and into a concentrated brine according to step e) of the method according to the invention. Preferably, the desalination unit is formed by a unit for thermal distillation or for membrane distillation.

The raw brine processing plant comprises moreover a solids unit for separation of the high-concentrated calcium-rich brine into solids and into water, preferably with a total ion content of smaller than 500 mg/l, according to step g) of the method according to the invention. Particularly preferred, the solids unit is formed by a unit for fractioned crystallization or for fractioned vacuum crystallization. As a result of the solids unit, the high-concentrated eluate of step f) can be separated completely into water and commercially utilizable salts.

The raw brine processing plant comprises also at least three heat exchangers, wherein the first and the second heat exchangers are connected in series and in front of the inlet into the sorption unit alternatively from above onto the first or from above onto the additional column for optional heating of the raw brine. The first heat exchanger in this context is in the form of a recuperator that can be heated with the partially decalcified concentrated brine from the desalination unit. The second heat exchanger can be heated or cooled with heated or cold water. The third heat exchanger is arranged downstream of the recuperator and upstream of the inlet into the sorption unit but alternatively from the bottom into the first or from the bottom into the second column. It is furthermore embodied for cooling the still warm, partially decalcified concentrated brine exiting from the recuperator from the desalination unit before entering the sorption unit. In an advantageous embodiment of the invention, the third heat exchanger is cooled by seawater or by the raw brine. The first and the third heat exchangers serve for controlling the temperature conditions upon passage of liquids through the sorption unit. The recuperator serves for recovery of energy that has been introduced for heating the liquids used in the method. In this way, the operating costs can be lowered.

In a preferred embodiment of the invention, between seawater desalination plant and raw brine processing plant a raw brine pretreatment group is arranged. The raw brine pretreatment group has at least one column with a granular material that removes solids and iron ions. It is especially preferred that the granular material is in the form of a natural zeolite. Due to the prior removal of the solids and iron ions from the raw brine before the brine enters the sorption unit, the service life of the sorption unit is improved.

BRIEF DESCRIPTION OF THE DRAWINGS

Further details and advantages of the invention can be taken from the following schematically illustrated embodiment. It is shown in:

FIG. 3 a schematic flow chart of producing, exhausting and regenerating TMZ.

DESCRIPTION OF PREFERRED EMBODIMENTS

Figure 1:
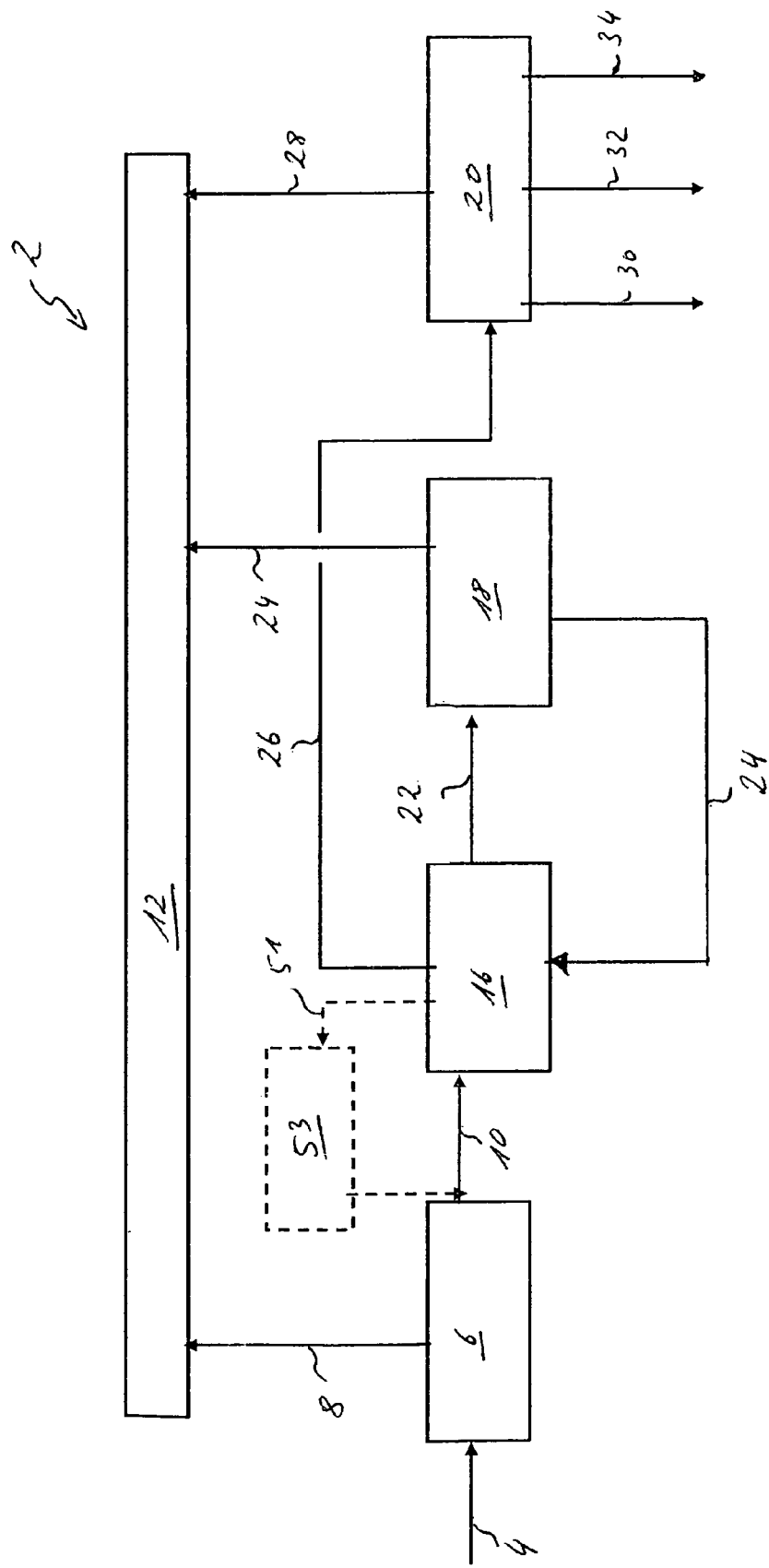
FIG. 1 a flow chart of a method according to the invention on a device according to the invention.

In the following, elements of the method or of the device that are acting in the same way are identified with a uniform reference numeral inasmuch as this is meaningful. Of course, the following explained features of the embodiment can also be subject matter of the invention individually or in other combinations.

FIG. 1 shows a flow chart of a device 2 according to the invention with which the method according to the invention is also illustrated. Seawater with a total salt content of, for example, 35 g/l flows into a seawater desalination plant 6, illustrated by arrow 4. The seawater desalination plant can be, for example, in the form of a thermal distillation plant (MSF, MED, vapor compression) or a reverse osmosis plant (SWRO). The seawater will be separated in the seawater desalination plant 6 into drinking water, illustrated by arrow 8, with a total salt content of less than 3,000 mg/l, in particular less than 500 mg/l, and into raw brine, for example, with a salt content of 65 g/l, illustrated by arrow 10. The drinking water is transferred into a storage 12.

The raw brine reaches a first section of a raw brine processing plant 14 comprising a sorption unit 16, a desalination unit 18. and a solids unit 20. Details of the raw brine processing plant 14 are described in detail in FIG. 2. FIG. 1 serves only to provide a rough overview.

The raw brine flows according to FIG. 1 first into the sorption unit 16. In the sorption unit 16 the calcium ions contained in the raw brine are retained and exchanged for sodium ions. The thus at least partially decalcified brine, illustrated by arrow 22, is guided into the desalination group 18. Here, the partially decalcified brine is separated into drinking water and a higher concentrated brine with a total salt content between 130 g/l and 300 g/l. The drinking water is passed from the desalination unit 18 into the storage 12, illustrated by arrow 24. The higher concentrated brine, in turn, is guided from the desalination unit 18 to the sorption unit 16, illustrated by arrow 24. By means of the higher concentrated brine that contains few calcium ions and many sodium ions, the TMZ contained in the sorption unit 16 is converted from the calcium form into the sodium form and the calcium-rich concentrated brine obtained thereby with a total ion content of 130 g/l to 300 g/l is supplied to the solids unit 20, illustrated by arrow 26. The solids unit 20 is preferably in the form of a unit for fractioned crystallization or fractioned vacuum crystallization. It separates the calcium-rich concentrated brine into drinking water that is then guided from there into the storage 12, illustrated by arrow 28, and into crystallized recovered solids, such as calcium sulfate, sodium chloride, and various potassium as well as magnesium salts, illustrated by the arrows 30, 32, and 34.

Figure 2:
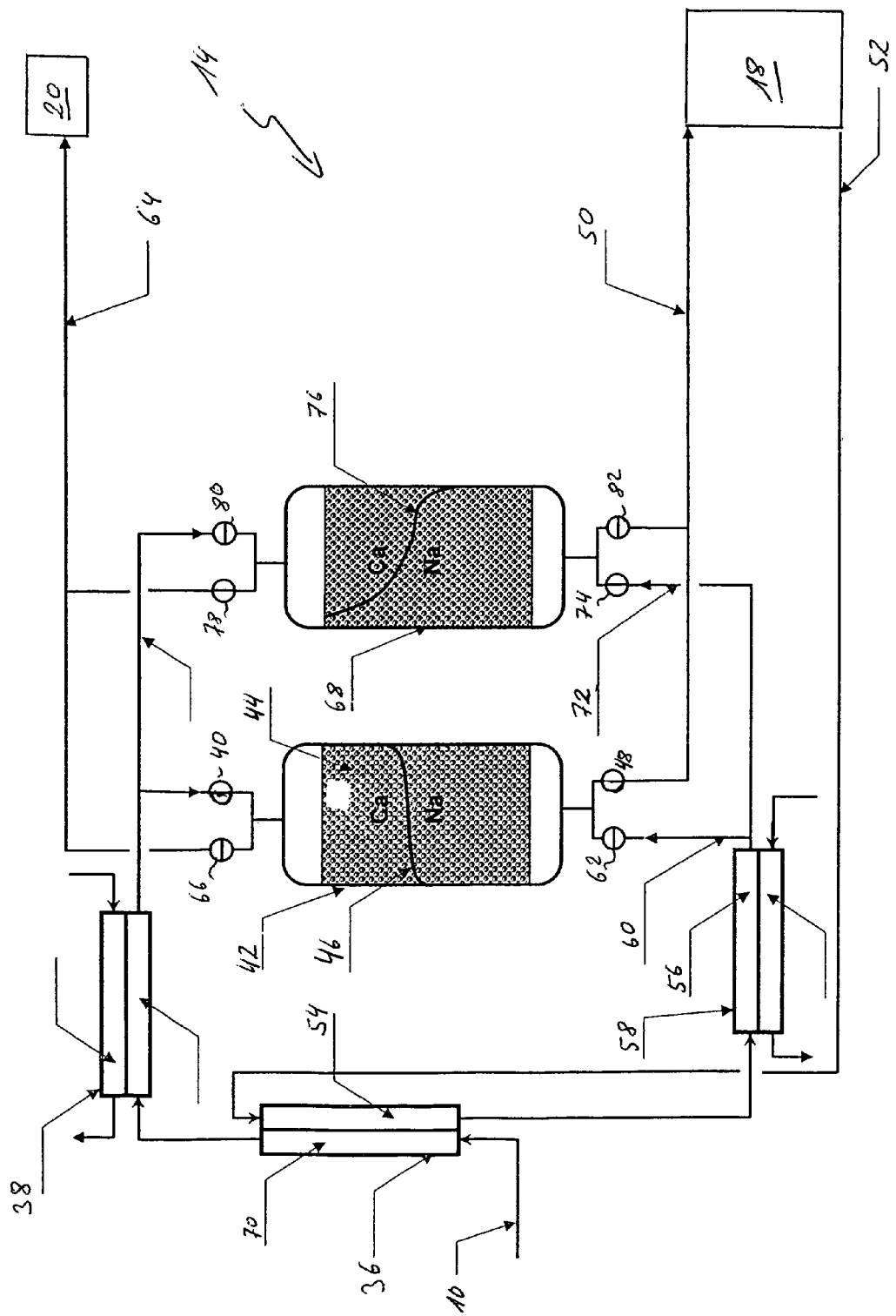
FIG. 2 a flow chart and switching diagram of the sorption unit and of the heat exchangers of FIG. 1.

FIG. 2 shows details of the raw brine processing plant 14. At the beginning, the zeolite A is converted into TMZ. For this purpose, raw brine with a salt content of, for example, 65 g/l, illustrated by arrow 10, is heated in a recuperator 36 and, subsequently, in a first heat exchanger 38 to a temperature between 75° C. and 100° C. and, subsequently, through valve 40 is guided to the first vertical column 42 with flow direction from top to bottom. The first vertical column 42 is packed with a bed of zeolite A. As a result of flow of the raw brine with a high magnesium ion content at a temperature of 75° C. to 100° C. through the bed of zeolite A, the zeolite A is converted into thermally modified zeolite (TMZ) 44. At the same time, the boundary 46 between the calcium form of the TMZ and the sodium form of the TMZ is moved in flow direction from top to bottom. The first calcium-poor portion of the eluate of the column 42 is supplied via valve 48 to the desalination unit 18. Here, the eluate is separated into freshwater, on the one hand, and a higher concentrated calcium-poor brine with a total salt content between 130 g/l and 300 g/l. The calcium-rich eluate that is subsequently exiting from the first column 42 is returned to the storage of raw brine to be processed, illustrated by line 51 and storage vessel 53.

The higher concentrated brine is subsequently guided for cooling via line 52 first through the heat-dissipating part 54 of the recuperator 36 and, subsequently, through the heat-dissipating part 56 of the heat exchanger 58 and is thereby cooled to a temperature of below 45° C. From here, the higher concentrated brine is passed through line 60 and through the valve 62 from the bottom into the first column 42. In doing so, the calcium form of TMZ is converted into the sodium form so that the boundary 46 between the forms moves in flow direction from bottom to top. The eluate of the calcium-rich higher concentrated brine which is exiting from the first column 42 is guided via line 64 through the valve 66 to the solids unit 20 where it is separated into solids, on the one hand, and into drinking water, on the other hand. With the additional vertically arranged column 68 that is packed in analogy to the first column 42, the analog process is performed. After conversion of the zeolite A into TMZ in the first column 42, the zeolite A in the additional column 68 is also converted in the same manner into TMZ by closing the valves 40 and 48 correlated with the first column 42 and opening the valves 80 and 82 correlated with the additional column 68.

Subsequently, the continuous operation of the raw brine processing plant 14 in accordance with the repeating steps d) to h) of the method according to the invention is performed. Raw brine is supplied from the raw brine processing plant 14 through the line 10 and through the cooling part 70 of the recuperator 36 and the second heat exchanger 38 and heated thereby to a temperature between 30° and 45°. The raw brine is subsequently guided through valve 40 onto the first column 42 wherein the boundary 46 between the calcium form and the sodium form of the TMZ 44 is moved in flow direction from top to bottom. The eluate of a partially decalcified brine which is exiting at the lower end of the first vertical column 42 is supplied through valve 48 and line 50 to the desalination unit 18 where it is separated into freshwater and a higher concentrated brine. The higher concentrated brine is guided through line 52 into the recuperator 36 and from there into the third exchanger 58 where it is cooled to a temperature of less than 45°. Cooling is in particular required when the higher concentrated brine has been heated beforehand, for example, in a distillation process in the desalination unit.

After exiting from the third heat exchanger 58 through line 72 and the valve 74, the higher concentrated sodium-rich and calcium-poor brine in flow direction from bottom to top is passed through the bed packing of TMZ of the additional column 68. In doing so, the calcium form of TMZ in the additional column 68 is converted into the sodium form and the boundary 76 between the calcium form and the sodium form of the TMZ is moved in the flow direction from bottom to top. The calcium-rich eluate of the concentrated brine that is exiting from the additional column is supplied via line 64 and valve 78 to the solids unit 20 for separation into solids and into drinking water.

The first column 42 and the additional column 68 are subsequently continuously operated in parallel. While, as illustrated in FIG. 2, raw brine in step d) flows first through the first column 42, in parallel thereto higher concentrated brine from the desalination unit is guided at the same time through the opened valves 74 and 78 for conversion of the calcium form of the TMZ into the sodium form. As soon as calcium ions break through the TMZ bed 44 of the first column, the valves 40 and 48 as well as 74 and 78 are closed and the valves 80 and 82 as well as 62 and 66 are opened. The raw brine to be processed flows then through the additional column 68 and is decalcified thereby while the higher concentrated brine from the desalination unit 18 enters through valve 62 in flow direction from bottom to top the first column 42 and converts therein the sodium form of TMZ into its calcium form. The columns 42, 68 are operated thus permanently in alternating operation and in parallel.

FIG. 3 illustrates the conversion of zeolite A 84 in TMZ 86 and its stabilization 88. Magnesium irons, dissolved in water, have at a temperature between 75° C. and 100° C. only a small hydrate envelope so that magnesium ions, without difficulty, can penetrate into sites of the zeolite A that are accessible for magnesium ions so that TMZ 86 is produced. Subsequently, the TMZ and the liquid remaining in the TMZ are cooled to a temperature of below 45°. In this way, the hydrate envelope of the magnesium ions become significantly larger so that the magnesium ion can no longer leave the TMZ. In this way, a stabilized form 88 of TMZ is produced. The hydrate envelope of the magnesium ions is indicated in FIG. 3 by circles of different size about the magnesium ion. During the permanent passage of raw brine, on the one hand, and higher concentrated decalcified brine, on the other hand, through the TMZ, TMZ's capacity is exhausted in that magnesium ions leave the TMZ despite fixation by means of the greater hydrate envelope. A cavity of the exhausted TMZ that has been previously occupied by a magnesium ion with a hydrate envelope and that has just been released is shown by reference numeral 90. The exhausted TMZ 90 is subsequently regenerated again, illustrated by arrows 92 and 94.

What is claimed is:

1. A method for treating raw brines from a desalination plant, the method comprising the following steps in sequence:
   a) passing a magnesium ion-containing solution with a magnesium ion content greater than 1 g/l at a temperature between 75° C. and 100° C. through a first column containing a bed packing of zeolite A with a flow direction from top to bottom and converting the bed packing of zeolite A to a bed of thermally modified zeolite (TMZ);
   b) cooling the interior of the first column with the bed of TMZ to a temperature of below 45° C.;
   c) passing a sodium ion-containing solution, having a sodium ion concentration of more than 50 g/l and having a temperature of below 45°, in a flow direction from bottom to top through the bed of TMZ;
   d) passing a raw brine to be treated at a temperature of 30° C. to 45° C. in a flow direction from top to bottom through the first column packed with the bed of TMZ until a calcium ion concentration of an eluate exiting from the first column surpasses a value of 1,000/n mg/l, indicating a break-through of calcium ions through the bed of TMZ, wherein n is a factor of concentration increase of the eluate in the next step e),
   e) separating the eluate of step d) in a desalination device into water with a total salt content of less than 500 mg/l and into a higher concentrated brine with a calcium ion concentration of less than 1,000 mg/l, wherein a concentration increase of the higher concentrated brine relative to the eluate of step d) by the factor n is realized,
   f) passing the concentrated brine of step e) at a temperature of below 45° C. in a flow direction from bottom to top through the bed of TMZ in the first column,
   g) separating a concentrated eluate of step f) in a solids unit into solids and water;
   h) repeating steps d) through g) until a capacity of the bed of TMZ is exhausted, wherein exhaustion of the bed of TMZ is expressed in that the eluate of step d) immediately after conversion of the bed of TMZ into a sodium form by the step f) already in a first bed volume that has passed through the first vertical column has a calcium ion concentration that, with otherwise identical conditions, is 20% higher than a calcium ion concentration in a first bed volume that has passed through the first column in the step d) immediately after performing the steps a) to c).

2. The method according to claim 1, comprising processing the exhausted bed of TMZ by repeating the steps a) to c) according to claim 1.

3. The method according to claim 1, comprising using a second column with a bed packing that is identical to that of the first column and operating the method continuously by performing steps a) to h) according to claim 1 also on the second column, wherein the steps on the first and second columns are performed temporarily displaced relative to each other such that the steps d) and f) according to claim 1 are always simultaneously and alternatingly performed on the first and second columns.

4. The method according to claim 1, wherein a temperature of the raw brine in step d) is always higher than a temperature of the higher-concentrated brine in step f) during flow through the bed of TMZ of the same first or second column.

5. The method according to claim 1, wherein the eluate of step d) is concentrated by the factor n in step e) and a flow speed in step d) is higher by the factor n than a flow speed in step f).

6. The method according to claim 1, wherein the magnesium ion-containing solution in step a) is passed through the packing bed of zeolite A or through the bed of TMZ with exhausted capacity until a chemical composition of the eluate is identical to the chemical composition of the magnesium ion-containing solution.

7. The method according to claim 1, wherein the magnesium ion-containing solution in step a) is a raw brine of a seawater desalination plant with a total salt content greater than 60 g/l and a calcium-poor eluate which is exiting from the first column in step a) as a concentrated, partially decalcified brine is subjected directly to step e), if the calcium ion concentration is smaller than 1,000/n mg/l, and the subsequently exiting calcium ion-rich eluate with a calcium ion concentration greater than 1,000/n mg/l is returned to the quantity of the raw brine from the desalination plant to be processed.

8. The method according to claim 1, wherein the sodium-containing solution in step c) is the partially decalcified and concentrated brine of step e).

9. The method according to claim 1, wherein step e) is carried out by thermal distillation or by membrane distillation and wherein a concentration to a total salt content of the concentrated brine of 130 to 300 g/l is realized.

10. A device for performing a method for treating raw brines from a desalination plant, the method comprising the following steps in sequence:
   a) passing a magnesium ion-containing solution with a magnesium ion content greater than 1 g/l at a temperature between 75° C. and 100° C. through a first column containing a bed packing of zeolite A with a flow direction from top to bottom and converting the bed packing of zeolite A to a bed of thermally modified zeolite (TMZ);
   b) cooling the interior of the first column with the bed of TMZ to a temperature of below 45° C.;
   c) passing a sodium ion-containing solution, having a sodium ion concentration of more than 50 g/l and having a temperature of below 45°, in a flow direction from bottom to top through the bed of TMZ;
   d) passing a raw brine to be treated at a temperature of 30° C. to 45° C. in a flow direction from top to bottom through the first column packed with the bed of TMZ until a calcium ion concentration of an eluate exiting from the first column surpasses a value of 1,000/n mg/l, indicating a break-through of calcium ions through the bed of TMZ, wherein n is a factor of concentration increase of the eluate in the next step e),
   e) separating the eluate of step d) in a desalination device into water with a total salt content of less than 500 mg/l and into a higher concentrated brine with a calcium ion concentration of less than 1,000 mg/l, wherein a concentration increase of the higher concentrated brine relative to the eluate of step d) by the factor n is realized,
   f) passing the concentrated brine of step e) at a temperature of below 45° C. in a flow direction from bottom to top through the bed of TMZ in the first column, g) separating a concentrated eluate of step f) in a solids unit into solids and water;

h) repeating steps d) through g) until a capacity of the bed of TMZ is exhausted, wherein exhaustion of the bed of TMZ is expressed in that the eluate of step d) immediately after conversion of the bed of TMZ into a sodium form by the step f) already in a first bed volume that has passed through the first vertical column has a calcium ion concentration that, with otherwise identical conditions, is 20% higher than a calcium ion concentration in a first bed volume that has passed through the first column in the step d) immediately after performing the steps a) to c);

the device comprising:

a seawater desalination plant for separating seawater into drinking water with a total ion content below 3 g/l and into a raw brine with a total salt content of more than 60 g/l;

a raw brine processing plant downstream of the seawater desalination plant, wherein the raw brine processing plant comprises:

i) a sorption unit adapted to partially remove calcium ions from the raw brine according to step d) of the method, the sorption unit comprising at least a first column and a second column that are vertically arranged and packed with a bed of thermally modified zeolite (TMZ), wherein the bed of TMZ is produced in that a solution with a magnesium ion content greater than 1 g/l at a temperature between 75° C. and 100° C. is passed through the first and second columns containing a packing of zeolite A;

ii) a desalination unit adapted to separate the partially decalcified brine from the sorption unit into water with a total ion content smaller than 500 mg/l and into a concentrated brine according to step e) of the method claim;

iii) a solids unit adapted to separate the high-concentrated calcium ion-rich brine into solids and into water with a total ion content smaller than 500 mg/l according to step g) of the method; and iv) at least a first, a second, and a third heat exchangers, wherein the first and the second heat exchangers are connected behind each other and upstream of an inlet into the sorption unit alternatively from above to the first column or from above to the second column for optional heating of the raw brine, wherein the first heat exchanger is a recuperator that is adapted to be heated with the partially decalcified concentrated brine from the desalination unit, and wherein the second heat exchanger is adapted to be heated or cooled with heated or cold water, and wherein the third heat exchanger, arranged downstream of the recuperator and upstream of the inlet into the sorption unit, is alternatively arranged at the bottom at the first column or at the bottom at the second column and is adapted to cool still warm, partially decalcified concentrated brine from the desalination unit that is exiting from the recuperator before entering the sorption unit.

11. The device according to claim 10, wherein the desalination unit is a thermal distillation unit or a membrane distillation unit.

12. The device according to claim 10, wherein the solids unit is a fractioned crystallization unit or a fractioned vacuum crystallization unit.

13. The device according to claim 10, wherein, between the seawater desalination plant and the raw brine processing plant, a raw brine pretreatment group is arranged that comprises at least one granular material-containing column.

14. The device according to claim 13, wherein the at least one granular material-containing column contains a natural zeolite that removes solids and iron ions.

* * * * *